(12) United States Patent
Naidu

(10) Patent No.: US 7,346,158 B1
(45) Date of Patent: Mar. 18, 2008

(54) METHOD AND SYSTEM FOR WIRING A DIGITAL SUBSCRIBER LINE CIRCUIT

(75) Inventor: Shersrin Naidu, Orlando, FL (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 626 days.

(21) Appl. No.: 10/280,908

(22) Filed: Oct. 25, 2002

(51) Int. Cl.
*H04M 3/00* (2006.01)
*H04M 5/00* (2006.01)
*H04M 1/00* (2006.01)
*H04M 9/00* (2006.01)

(52) U.S. Cl. .................................. 379/326; 379/399.01

(58) Field of Classification Search ................ 379/326, 379/93.05, 93.28, 93.08, 9, 399.01; 327/142; 370/352, 493, 490, 463; 375/222, 211; 725/78
See application file for complete search history.

(56) References Cited

U.S. PATENT DOCUMENTS

| | | | |
|---|---|---|---|
| 5,930,340 A * | 7/1999 | Bell | 379/93.08 |
| 6,353,347 B1 * | 3/2002 | deBrigard | 327/142 |
| 6,480,575 B2 * | 11/2002 | Chea et al. | 379/9 |
| 6,507,606 B2 * | 1/2003 | Shenoi et al. | 375/211 |
| 6,574,309 B1 * | 6/2003 | Chea et al. | 379/9 |
| 6,731,653 B1 * | 5/2004 | Henderson et al. | 370/490 |
| 6,754,233 B1 * | 6/2004 | Henderson et al. | 370/493 |
| 6,754,318 B2 * | 6/2004 | Oksman et al. | 379/93.28 |
| 6,782,097 B2 * | 8/2004 | Witty et al. | 379/399.01 |
| 6,785,265 B2 * | 8/2004 | White et al. | 370/352 |
| 6,829,336 B1 * | 12/2004 | Issaa et al. | 379/93.05 |
| 2002/0105964 A1 * | 8/2002 | Sommer et al. | 370/463 |
| 2003/0063660 A1 * | 4/2003 | Shenoi et al. | 375/222 |
| 2005/0034159 A1 * | 2/2005 | Ophir et al. | 725/78 |

OTHER PUBLICATIONS

Technical Report, TR-001, ADSL Forum System Reference Model, May 1996, p. 1-6.
Technical Report, TR-007, Interfaces and System Configurations for ADSL: Customer Premises, Mar. 1998, p. 1-25.
Technical Report, TR-013, Interfaces and System Configurationsi for ADSL: Central Office, Jan. 1999, p. 1-25.
Technical Report, TR-022, The Operation of ADSL-based Networks, p. 1-26.

* cited by examiner

*Primary Examiner*—Thjuan K. Addy
(74) *Attorney, Agent, or Firm*—Merchant & Gould

(57) ABSTRACT

A method and system are provided for wiring a digital subscriber line circuit between a customer premises and a central office. A first connection for a first cable pair is established between the customer premises and a distribution frame in the central office. The first cable pair carries a full range signal from the customer premises to the distribution frame. A second connection is established at the distribution frame for a second cable pair between the distribution frame and a digital subscriber line access mulitplexer (DSLAM) in the central office for routing the full range signal from the first cable pair. A third connection is also established at the distribution frame for a third cable pair between the distribution frame and a voice switch in the central office for routing the full range signal from the first cable pair. The second and third cable pairs are connected to the first cable pair at the distribution frame to create a parallel connection for the DSL circuit between the customer premises and the DSLAM as well as between the customer premises and the voice switch.

11 Claims, 3 Drawing Sheets

METHOD AND SYSTEM FOR WIRING A DIGITAL SUBSCRIBER LINE CIRCUIT

TECHNICAL FIELD

The present invention generally relates to the field of broadband data communications and, more specifically, relates to the field of digital subscriber line communications.

BACKGROUND OF THE INVENTION

The advent and explosion of the World Wide Web and the Internet have created a huge demand for data communications bandwidth. Once satisfied with a 56 Kb/s analog modem, many home users are now demanding broadband Internet connections capable of sustaining 1.5 Mb/S, or more. In order to satisfy this ever-increasing demand for bandwidth to the home and office, several competing standards for data communications have emerged. One of these standards is digital subscriber line ("DSL") technology.

DSL is a high-speed connection that utilizes the same wires as a regular telephone line. DSL offers a number of advantages over other types of high-speed links to the home and office. For instance, because DSL utilizes a higher frequency for data communications than that used for voice communications, the same phone line may be used for both data and voice simultaneously. Moreover, several different types of DSL connections exist that can provide extremely high data rates without requiring new wiring. Therefore, DSL can operate on the existing phone line already present in most homes and businesses. Additionally, other types of broadband connections to the home such as cable modems, utilize a shared network group for a number of subscribers. Adding users to such a shared network means lower performance in many instances. Because DSL provides a dedicated connection from each user back to the nearest central office ("CO"), users typically do not see a performance decrease as new users are added.

A typical DSL installation utilizes several pieces of equipment. A transceiver, or modem, is located at the customer end, and a DSL access multiplexer ("DSLAM") and a voice switch are located at the CO serving the customer. A DSL transceiver located at the customer location connects to a customer's data processing equipment and to the standard telephone line connection located at the customer premises. The DSLAM, located at the CO serving the customer is also connected to the telephone line that the DSL transceiver is connected to. The voice switch is connected to the telephone line shared by the DSL transceiver and the customer's telephone at the customer premises and provides voice communication between the central office and the customer premises over the public switched telephone network ("PSTN").

A typical DSL circuit is wired by terminating the telephone line from the customer on one side of a distribution frame located in the CO. The wiring from the DSLAM is terminated on the other side of the distribution frame. A cross connection is typically made between the two terminations to establish the connection between the customer telephone line and the DSLAM. The voice switch is typically wired to the DSLAM. In the wired DSL circuit, the DSLAM receives the voice and data communications from the customer telephone line through the distribution frame. The DSLAM then sends the data communications to a data switch connected to a data communications network and the voice communications to the voice switch connected to the PSTN.

Current schemes for wiring a DSL circuit in a CO suffer from a number of problems. The first problem is that in large central offices, the DSLAM is often located a significant distance (or even on a separate floor) from both the distribution frame and the voice switch, requiring significant lengths of wire to connect to the DSLAM. Such significant wiring lengths results in additional man-hours being used to route the wire between the affected equipment in large central offices in addition to the cost of the wire. Another problem with current wiring schemes is the customer voice communication outage that occurs when a connection to the DSLAM is removed (e.g., when a customer no longer desires DSL service). Because the DSLAM also provides the connection from the customer's telephone line to the voice switch, the customer will no longer receive a dial tone from the voice switch until the circuit is rewired at the distribution frame. Because providing normal telephone service is a highly competitive business, such downtime may result in the unacceptable loss of customers. At a minimum, such downtime can result in unhappy customers and reduced network availability.

Therefore, in light of the above, there is a need for a method and system for wiring a DSL circuit between a DSLAM and a voice switch that can minimize the amount of wire required to establish connections for the circuit. Additionally, there is a need for a method and system that can eliminate the amount of customer downtime experienced when the DSLAM is disconnected from the DSL circuit.

SUMMARY OF THE INVENTION

The present invention solves the above-described problems by providing a method and system for wiring a DSL circuit between a distribution frame, a DSLAM, and a voice switch in a central office that reduces the amount of wiring required and eliminates downtime experienced by DSL customers when the circuit is disconnected from the DSLAM. According to an exemplary embodiment of the invention, a method and system are provided for wiring a DSL circuit between a customer premises and a network service provider premises.

According to one embodiment of the present invention, a first connection for a first cable pair is established between the customer premises and a distribution frame in the central office. The first cable pair carries a full range signal from the data communications equipment located at the customer premises to the distribution frame.

A second connection is established at the distribution frame for a second cable pair between the distribution frame and a data network interface device in the network service provider premises for routing the full range signal from the first cable pair. A third connection is also established at the distribution frame for a third cable pair between the distribution frame and a voice switch in the network service provider premises for routing the full range signal from the first cable pair. In one embodiment the second and third cable pairs are connected to the first cable pair at the distribution frame. In this manner, a parallel circuit connection is created between the customer premises and the data network interface device as well as between the customer premises and the voice switch.

In order for the data network interface device to communicate data with a data switch, a low frequency range signal may be filtered from the full range signal leaving a high frequency signal compatible with the data network interface device. In order for the voice switch to communicate voice communications with a telecommunications network, a high frequency range signal may be filtered from the full range signal leaving a low frequency signal compatible with the voice switch. The second cable pair may include a jumper for connecting the second cable pair to the first cable pair and the third cable pair may include a jumper for connecting the third cable pair to the second cable pair. The network service provider premises may be a central office and the data network interface device may be a DSLAM.

Additional aspects of the present invention will be apparent from the detailed description that follows.

DETAILED DESCRIPTION OF AN ILLUSTRATIVE EMBODIMENT

In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
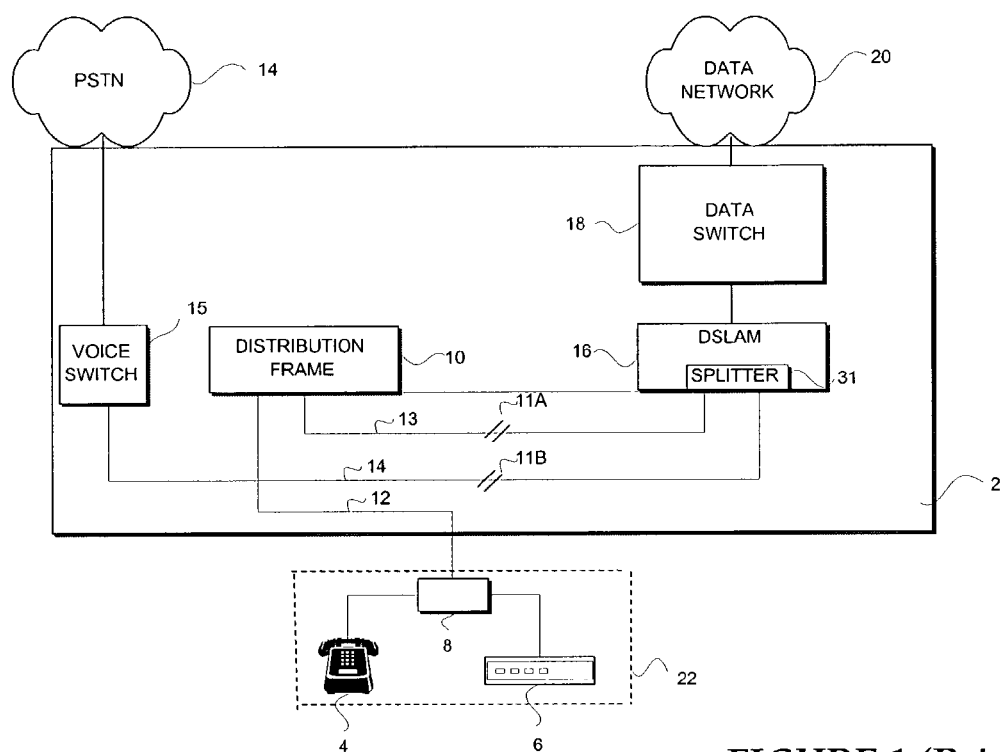
FIG. 1 is a block diagram showing a typical systems architecture for a telecommunications system for delivering DSL services.

Referring now to FIG. 1, a typical systems architecture for implementing a DSL telecommunications service will be described. As shown in FIG. 1, a CO 2 is connected to the customer premises 22 through a cable pair 12 which is a standard plain old telephone service ("POTS") telephone line. The customer premises 22 includes a DSL transceiver 6 and telephone 4. Filter 8 is utilized to separate the voice and DSL signals. At the CO 2, the cable pair 12 connects through the filter 8. The CO 2 maintains the equipment necessary to provide a DSL telecommunications service to the customer premises 22. The filter 8 routes the incoming cable pair 12 to the distribution frame 10 at the CO 2. At the distribution frame 10, a second cable pair 13 routes a full range signal containing both voice and data from the customer premises to the DSLAM 16. In central offices where the DSLAM is located a significant distance from the distribution frame, it may be necessary to utilize one or more tie pairs 11A to connect a series of cable pairs to establish the connection between the DSLAM and the frame. As is known to those skilled in the art, a cross-connect or jumper may be used to connect the cable pair 12 to the cable pair 13 on the distribution frame 10 thus establishing the connection between the customer premises 22 and the DSLAM 16.

The full range signal received by the DSLAM 16 from the cable pair 13 is filtered by splitter 31 into a high frequency data portion and a low frequency voice portion. In this manner, the voice portion of the signal received from the customer premises 22 may be handled separately from the data portion of the signal. The low frequency voice portion of the signal is routed by the DSLAM 16 to the voice switch 15 over cable pair 14 and forwarded to the public switched telephone network 14. In central offices where the voice switch located a significant distance from the DSLAM, it may be necessary to utilize one or more tie pairs 11B to connect a series of cable pairs to establish the connection between the voice switch and the DSLAM. The high frequency data portion of the signal is routed by the DSLAM 16. As known to those skilled in the art, a DSLAM aggregates digital data traffic from digital subscriber lines before the traffic is transferred to an ATM switch 18, or other type of data switch. The DSLAM 16 is connected to the ATM switch 18 through one or more trunk lines that carry the multiplexed traffic from the DSLAM to the ATM switch 18. In turn, the ATM switch 18 is connected to the data network 20, which may comprise the Internet, or other type of network.

As shown in FIG. 1, in the typical DSL circuit wiring scheme, the voice and data signals from the customer premises are first routed through the DSLAM 16 and then to the voice switch 15. Accordingly, when the connection to the DSLAM 16 is removed, the voice switch will also be disconnected from the customer premises resulting in a loss of dial tone and voice communications. Embodiments of the present invention provide a method and system for wiring a DSL circuit so as to maintain a connection between the customer premises and the voice switch even when the connection to the DSLAM is removed.

Figure 2:
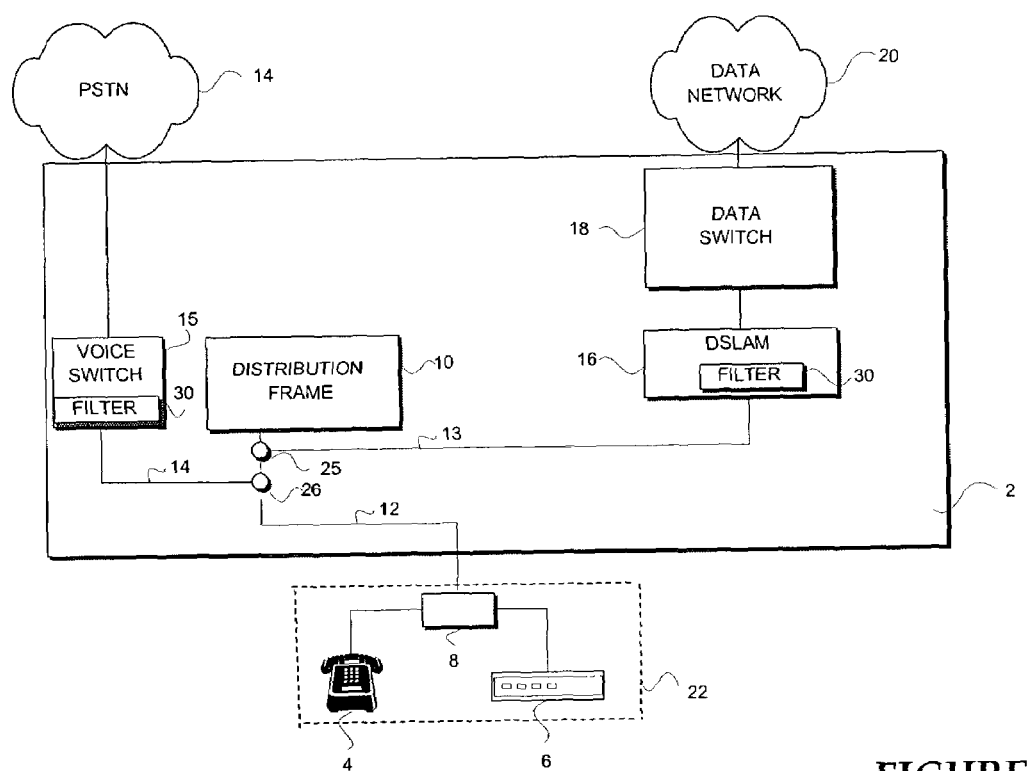
FIG. 2 is a block diagram showing a systems architecture for an illustrative telecommunications system for delivering DSL services in accordance with an embodiment of the present invention.

Referring now to FIG. 2, an illustrative system architecture for an embodiment of the present invention will be described. As shown in FIG. 2 and described above, a full range signal is received at the distribution frame 10 from the customer premises 22 over the cable pair 12. In this embodiment, one end of the cable pair 13 is connected to the cable pair 12 using jumper 25. The other end of the cable pair 13 is connected to the DSLAM 16. Similarly, one end of cable the pair 14 is connected to the cable pair 12 using jumper 26 while the other end of the cable pair 14 is connected to the voice switch 15. In this manner, a parallel connection is established between the customer premises 22, the DSLAM 16, and the voice switch 15 so that the full range signal from the customer premises 22 is routed to both the DSLAM 16 and the voice switch 15.

The filters 30 may be used to extract the high frequency data signal from the full range signal received by the DSLAM 16 over the cable pair 13 and to extract the low frequency voice signal from the full range signal received by the voice switch 15 over the cable pair 14. In one embodiment, the filters 30 may be integrated in the DSLAM 16 and the voice switch 15. In another embodiment, the filters 30 may be located adjacent to the DSLAM 16 and the voice switch 15. Other locations may also be utilized for the filters 30 which will be apparent to those skilled in the art. The filters 30 may be low and high pass filters utilized to pass the low and high frequency signals from the full range signal carried by the cable pair 13 and the cable pair 14.

Figure 3:
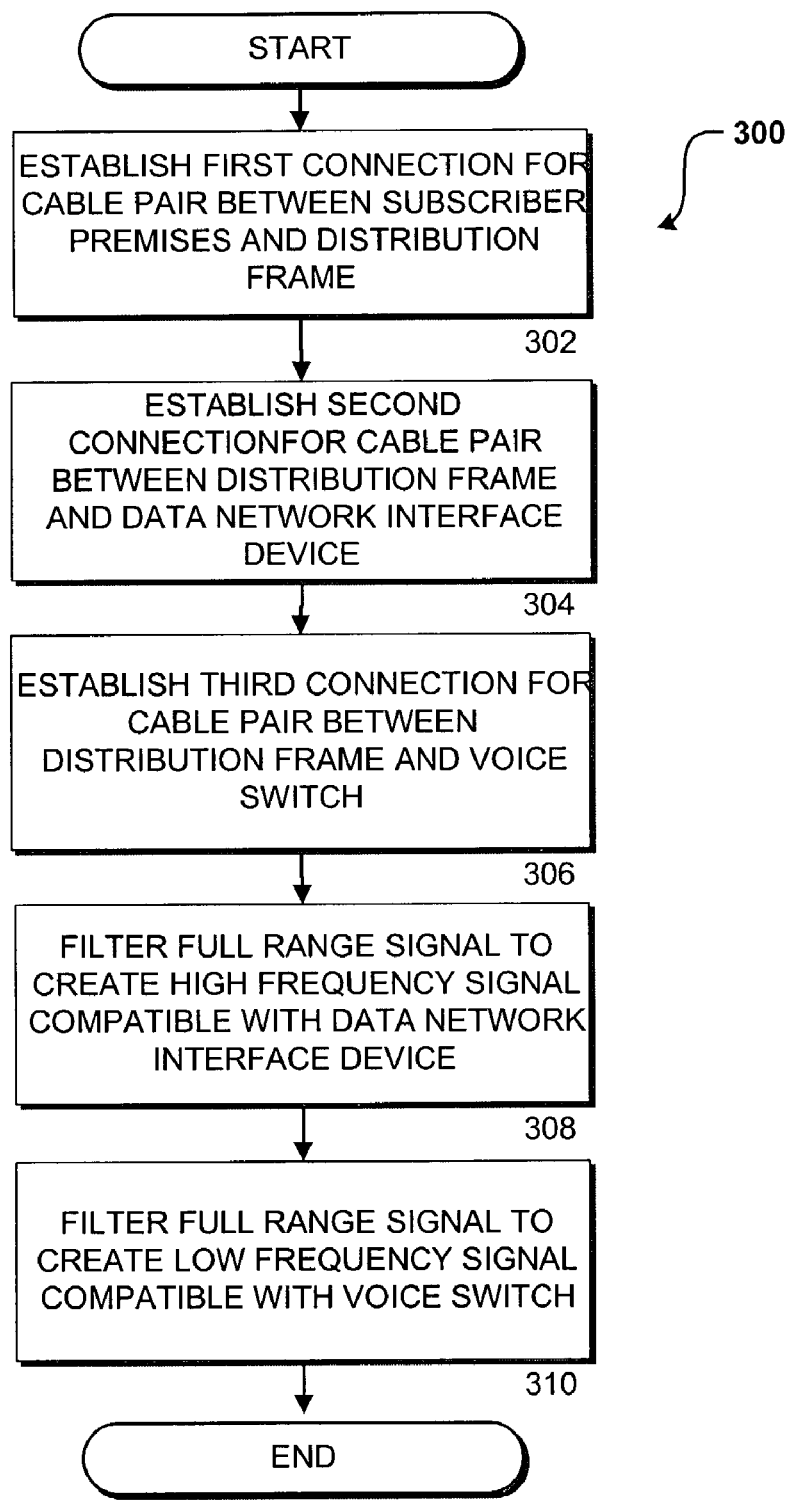
FIG. 3 is a flow diagram illustrating an exemplary method for wiring a DSL circuit between a customer premises, a DSLAM, and a voice switch.

Referring now to FIG. 3, an illustrative routine 300 will be described for wiring a DSL circuit between a customer premises, a DSLAM, and a voice switch. The routine 300 begins at block 302, where a first connection is established for the cable pair 12 between the customer premises 22 and the distribution frame 10. As described above, the cable pair 12 carries the full range signal from the customer premises 22 which includes both a voice portion and a data portion. From block 302 the routine 300 continues to block 304 where a second connection for the cable pair 13 is established between the distribution frame 10 and the DSLAM 16. As described above, the cable pair 12 is connected to the cable pair 13 at the distribution frame 10 using a jumper 25, thus routing the full range signal from the cable pair 12 over the cable pair 13.

From block 304, the routine 300 continues to block 306 where a third connection for the cable pair 14 is established between the distribution frame 10 and the voice switch 15. As described above, the cable pair 14 is connected to the cable pair 12 at the distribution frame 10 using jumper 26, thus routing the full range signal from the cable pair 12 over the cable pair 14. From block 306, the routine 300 continues to block 308 where the full range signal from the cable pair 13 is filtered to create a high frequency data signal compatible with the DSLAM 16. As described above, the full range signal may be filtered to create converted the high frequency data signal by the filter 30 which may be integrated in the DSLAM 16. The data signal is then sent by the DSLAM 16 to the data switch 18 for transmission over the data network 20.

From block 308, the routine 300 continues to block 310 where the full range signal from the cable pair 14 is filtered to create a low frequency voice signal compatible with the voice switch 15. As described above, the full range signal may be filleted to create the low frequency voice signal by the filter 30 which may be integrated in the voice switch 15. The voice signal is then sent by the voice switch 15 over the public switched telephone network 14.

It should be appreciated that according to various embodiments of the invention, the parallel connection created by the wiring scheme described above allows the full range signal from the customer premises 22 to be routed simultaneously to both the voice switch 15 and the DSLAM 16. In this manner, the voice switch 15 will maintain communication with the customer premises 22 even when the connection to the DSLAM 16 is removed. Therefore, dial tone and voice communication between the customer premises and the PSTN 14 is maintained. It will also be appreciated that the above-described wiring scheme provides a wiring connection between the distribution frame 10 and the voice switch 15. Therefore, unlike current wiring schemes, it is not necessary to utilize wire to connect the DSLAM 16 to the voice switch 15. In central offices where the DSLAM is located a significant distance from the voice switch, the above-described wiring scheme will realize a significant savings of wire and tie pairs as well as a savings in the man-hours used to connect these pieces of equipment in the central office.

It will be apparent to those skilled in the art of the various modifications or variations may be made in the present invention without departing from the scope or spirit of the invention. Other embodiments of the invention will be apparent to those skilled in the art from consideration of the specification and practice of the invention disclosed herein.

We claim:

1. A method for wiring a digital subscriber line circuit between a customer premises and a network service provider premises comprising:
    establishing a first connection for a first cable pair between the customer premises and a distribution frame at the network service provider premises, wherein the first cable pair carries a full range signal from the customer premises to the distribution frame;
    establishing a second connection at the distribution frame for a second cable pair between the distribution frame and a data network interface device at the network service provider premises for routing the full range signal from the customer premises to the data network interface, wherein the second cable pair is connected, at the distribution frame, to the first cable pair carrying the full range signal from the customer premises to the distribution frame;
    establishing a third connection at the distribution frame for a third cable pair between the distribution frame and a voice switch at the network service provider premises for routing the full range signal from the customer premises to the voice switch, wherein the third cable pair is connected, at the distribution frame, to the first cable pair carrying the full range signal from the customer premises to the distribution frame;
    filtering, with a first filter, a first low frequency signal from the full range signal received at the data network interface device from the distribution frame to create a first high frequency signal, the first high frequency signal being compatible with the data network interface device; and
    filtering, with a second filter, a second high frequency signal from the full range signal received at the voice switch from the distribution frame to create a second low frequency signal, the second low frequency signal being compatible with the voice switch.

2. The method of claim 1, wherein the network service provider premises is a central office.

3. The method of claim 1, wherein the data network interface device is a digital subscriber line access multiplexer.

4. The method of claim 1, wherein the data network interface device transmits the high frequency data signal to a data switch in the network service provider premises.

5. The method of claim 4, wherein the data switch communicates the high frequency data signal over a data network.

6. The method of claim 1, wherein the voice switch communicates the low frequency signal over a telecommunications network.

7. A system for wiring a digital subscriber line circuit between a customer premises and a central office, comprising:
    a distribution frame at the central office for receiving a first cable pair carrying a full range signal from the customer premises;
    a second cable pair connected to the first cable pair at the distribution frame for carrying the full range signal from the first cable pair to a digital subscriber line access multiplexer, wherein the second cable pair comprises a first jumper for connecting the second cable pair to the first cable pair at the distribution frame;
    a third cable pair connected to the first cable pair at the distribution frame for carrying the full range signal from the first cable pair to a voice switch, wherein the third cable pair comprises a second jumper for connecting the third cable pair to the first cable pair at the distribution frame;
    the digital subscriber line access multiplexer connected to the second cable pair carrying the full range signal from the distribution frame and a first filter for filtering the full range signal received at the digital subscriber line access multiplexer to create a high frequency signal compatible with the digital subscriber line access multiplexer; and
    the voice switch connected to the third cable pair carrying the full range signal from the distribution frame and a second filter for filtering the full range signal received at the voice switch to create a low frequency signal compatible with the voice switch.

8. The system of claim 7, wherein the digital subscriber line access multiplexer transmits the high frequency data signal to a data switch in the central office.

9. The system of claim 8, wherein the digital subscriber line access multiplexer communicates the high frequency data signal over a data network.

10. The system of claim 7, wherein the voice switch communicates the low frequency signal over a telecommunications network.

11. An improved method for wiring a digital subscriber line circuit between a customer premises and a central office, the method comprising:

establishing a first connection for a first cable pair between the customer premises and a distribution frame at the central office, wherein the first cable pair carries a full range signal from the customer premises to the distribution frame at the central office;

establishing a second connection for a second cable pair between the distribution frame and a digital subscriber line access multiplexer at the central office for carrying the full range signal from the first cable pair to the digital subscriber line access multiplexer, wherein the second cable pair is connected, at the distribution frame, to the first cable pair carrying the full range signal from the customer remises to the distribution frame at the central office;

establishing a third connection at the distribution frame for a third cable pair between the distribution frame and a voice switch at the central office for carrying the full range signal from the first cable pair to the voice switch, wherein the third cable pair is connected, at the distribution frame, to the first cable pair carrying the full range signal from the customer premises to the distribution frame at the central office;

filtering the full range signal received at the digital subscriber line multiplexer carried by the second cable pair with a first filter to create a high frequency data signal compatible with the digital subscriber line access multiplexer, wherein the digital subscriber line access multiplexer transmits the high frequency data signal to a data switch in the central office; and filtering the full range signal received at the voice switch carried by the third cable pair with a second filter to a create a low frequency voice signal compatible with the voice switch, wherein the voice switch communicates the low frequency signal over a telecommunications network.

* * * * *